(12) United States Patent
Chu et al.

(10) Patent No.: US 7,164,431 B1
(45) Date of Patent: \*Jan. 16, 2007

(54) SYSTEM AND METHOD FOR MIXING GRAPHICS AND TEXT IN AN ON-SCREEN DISPLAY APPLICATION

(75) Inventors: Cyrus Chu, Fremont, CA (US); Chang-Hau Lee, Fremont, CA (US)

(73) Assignee: Pixelworks, Inc., Tualatin, OR (US)

( * ) Notice: Subject to any disclaimer, the term of this patent is extended or adjusted under 35 U.S.C. 154(b) by 549 days.

This patent is subject to a terminal disclaimer.

(21) Appl. No.: 10/142,396

(22) Filed: May 8, 2002

Related U.S. Application Data (60) Provisional application No. 60/289,679, filed on May 8, 2001.

(51) Int. Cl.
*G09G 5/00* (2006.01)
*H04N 5/445* (2006.01)
*H04N 5/50* (2006.01)
*G06F 3/00* (2006.01)
*G06F 13/00* (2006.01)

(52) U.S. Cl. ..................... 345/636; 348/569; 348/563; 725/37; 345/634; 345/629

(58) Field of Classification Search ................ 345/636, 345/602, 551, 468–472.3, 552, 629–64
See application file for complete search history.

(56) References Cited

U.S. PATENT DOCUMENTS

| | | | |
|---|---|---|---|
| 4,965,670 A * | 10/1990 | Klinefelter | 348/586 |
| 5,475,808 A * | 12/1995 | Kobayashi | 345/467 |
| 5,579,057 A * | 11/1996 | Banker et al. | 348/589 |
| 6,181,353 B1 * | 1/2001 | Kurisu | 345/537 |
| 6,188,835 B1 * | 2/2001 | Grandbois | 386/126 |
| 6,195,078 B1 * | 2/2001 | Dinwiddie et al. | 345/636 |
| 6,381,507 B1 * | 4/2002 | Shima et al. | 700/83 |
| 6,483,510 B1 * | 11/2002 | Jeong | 345/467 |
| 6,570,626 B1 * | 5/2003 | Mendenhall et al. | 348/569 |
| 6,661,467 B1 * | 12/2003 | Van Der Meer et al. | 348/564 |
| 6,751,356 B1 * | 6/2004 | Oki | 382/240 |
| 6,853,466 B1 * | 2/2005 | Harada et al. | 358/1.9 |
| 2002/0003633 A1 * | 1/2002 | Matsumoto et al. | 358/1.9 |
| 2002/0051230 A1 * | 5/2002 | Ohta | 358/448 |
| 2002/0113806 A1 * | 8/2002 | Clark-Schreyer et al. | 345/660 |
| 2002/0191104 A1 * | 12/2002 | Matsutani et al. | 348/441 |
| 2002/0191202 A1 * | 12/2002 | Furuya | 358/1.9 |
| 2003/0231205 A1 * | 12/2003 | Shima et al. | 345/744 |
| 2004/0246254 A1 * | 12/2004 | Opstad et al. | 345/467 |

\* cited by examiner

*Primary Examiner*—Ryan Yang
*Assistant Examiner*—Eric Woods
(74) *Attorney, Agent, or Firm*—Marger Johnson & McCollom P.C.

(57) ABSTRACT

The invention provides a system and method for mixing graphics and text in an on-screen display application. The system includes font and character memories. The font memory stores bitmaps associated with characters to be displayed on a display device. The character memory, in turn, includes a font portion and an attribute portion. The font portion stores a font index of characters to be displayed, the font index being used to address the font memory. The attribute portion stores a plurality of attributes associated with a character to be displayed. The plurality of attributes includes a text/graphic attribute indicative of a text character or a graphic clip and a redirection attribute indicating mapping of a main color memory using an expanded color memory.

19 Claims, 5 Drawing Sheets

SYSTEM AND METHOD FOR MIXING GRAPHICS AND TEXT IN AN ON-SCREEN DISPLAY APPLICATION

This application claims priority from U.S. provisional patent application Ser. No. 60/289,679, filed May 8, 2001, incorporated herein by reference.

BACKGROUND OF THE INVENTION

1. Field of the Invention

The invention provides for a system and method for manipulating digital image data capable of being displayed on a variety of digital display devices including flat panel displays. More particularly, the invention provides for a system and method for mixing graphics and text in an on-screen display (OSD) application.

2. Background of the Invention

Current display systems include on-screen display (OSD) circuitry capable of displaying, on a predetermined portion of the display device, textual and/or graphic information overlaid on signals typically provided to the display device. Television sets, for example, often display channel numbers and/or closed captioning text over video signals associated with the displayed show. Computer monitors, for another example, often display brightness, contrast, or other control information over running software applications, e.g., word processing, spreadsheet, drawing, and other applications.

OSD circuitry operates in either graphic or text mode. High-end display systems often implement OSD circuitry using the graphic mode. In graphic mode, the OSD circuitry stores bitmaps in typically large memories. Bitmaps represent a graphic image using rows and columns of picture elements (pixels) stored in memory. The OSD circuitry stores the value of each pixel in one or more bits of data, e.g., 2 to 24 bits per pixel. The value of each pixel might represent luminance of the corresponding pixel. The more colors and shades of gray, the more bits the OSD circuitry uses to represent the value of the pixel. The OSD circuitry provides the bitmap to the display.

The OSD circuitry requires a larger bitmap memory the more bits it uses to represent the pixel. Consequently, the cost of the OSD circuitry increases proportionately to the number of bits used to represent the value of each bitmapped image pixel. For example, assume the OSD circuitry wants to display a 512×200 bitmapped image in at least 16 colors (4 bits for each pixel) to an XGA (1024×768) resolution display device. In this example, the bitmap memory must be at least 50 Kbytes.

(512×200 pixels)×(4 bits/pixel)×(1 byte/8 bits)=50 Kbytes

The bitmap memory increases to over 200 Kbytes if the OSD circuitry displays the same 512×200 bitmapped image in 256 colors (8 bits for each pixel).

(512×200 pixels)×(16 bits/pixel)×(1 byte/8 bits)=200 Kbytes

Because of memory cost, low-end display systems implement OSD circuitry using the text mode. Instead of storing graphic image bitmaps in large memories, the OSD circuitry stores individual character codes in smaller character memory, e.g., random access memory. The OSD circuitry uses the character codes to look up simple bitmaps of the individual characters in smaller font memory, typically implemented as either random access or read-only memories. These simple bitmaps include a single bit value for each pixel, the bit value indicating a foreground and a background color.

Graphic mode is advantageous over text mode in situations requiring depth of color or shades of gray and complicated graphics. Text mode is advantageous over graphic mode when cost is at issue. The memory costs associated with graphic mode far exceed the memory costs associated with text mode. Text mode is also advantageous over graphic mode because the OSD circuitry —more particularly, OSD software and/or firmware—is easier to maintain in text mode than it is in graphic mode. In text mode, the OSD software can easily modify a character to be displayed by simply changing its corresponding character code stored in character memory. In graphic mode, the OSD software and/or firmware must rewrite the entirety of the bitmap to change any portion of it often requiring complex graphic engines to speed up the process.

Accordingly, a need remains for a system and method of incorporating graphics in a text mode OSD application.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

Figure 1:
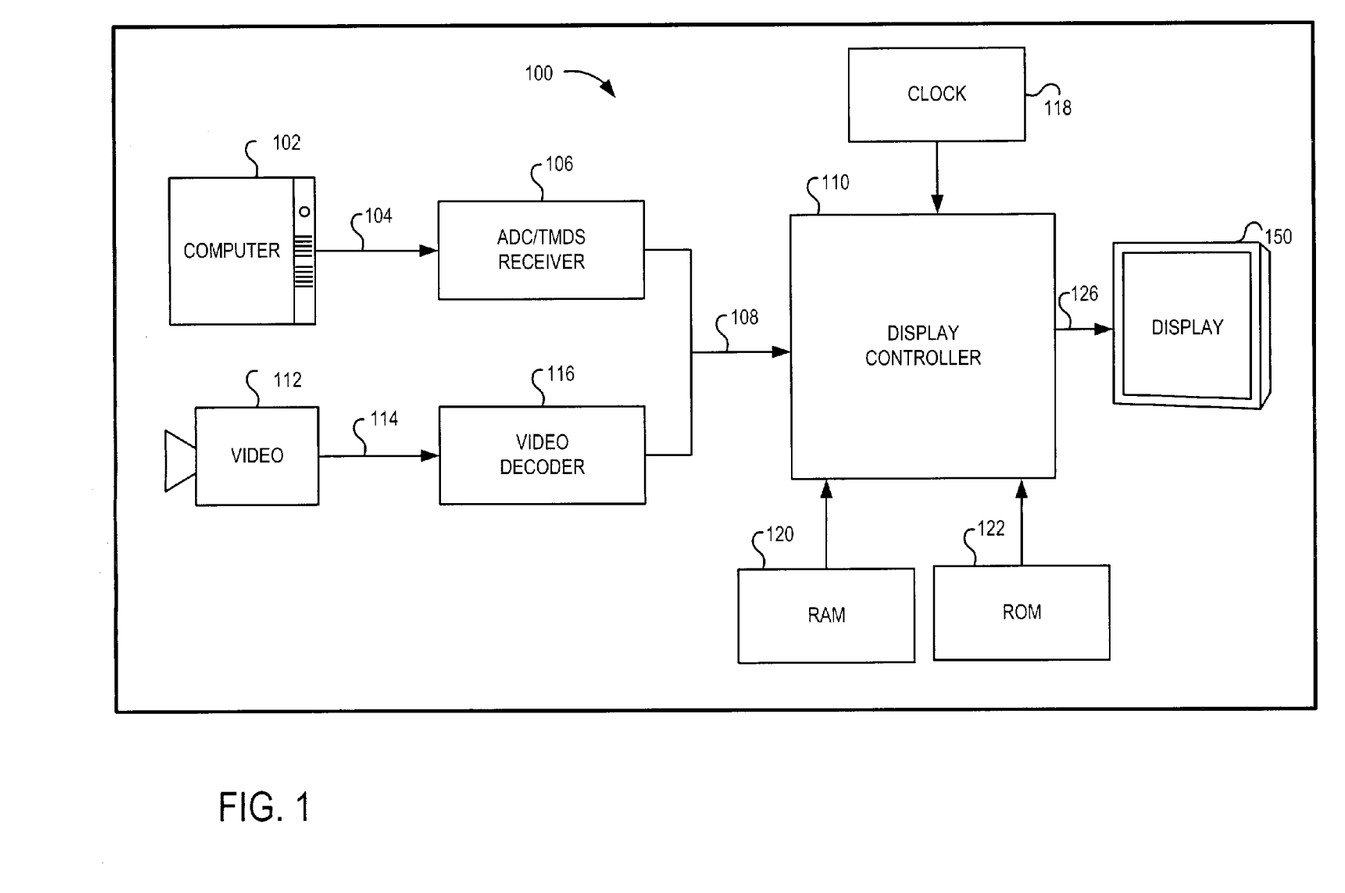
FIG. 1 is a block diagram of an embodiment of the display system of the present invention.

FIG. 1 is a block diagram of a system 100 adapted to display an image. The system includes a receiver 106 for receiving an analog image data signal 104, e.g., an RGB signal, from a source 102. The receiver 106 might be an analog-to-digital converter (ADC), transition minimized differential signal (TMDS) receiver, or the like. The source 102 might be a personal computer or the like. Likewise, a video receiver or decoder 116 decodes an analog video signal 114 from a video source 112. The video source 112 might be a video camcorder or the like. The receiver 106 converts the analog image data signal 104 into digital image data 108. Likewise, the decoder 116 converts the analog video signal 114 into digital image data 108. The receiver 106 provides the digital image data 108 to the display controller 110.

The display controller 110 generates display data 126 by manipulating the digital image data 108. The display controller 110 provides the display data 126 to a display device 150. The display device 150 is any device capable of displaying digital image data 108. In one embodiment, the display 150 is a pixelated digital display that has a fixed pixel structure. Examples of pixelated displays are a liquid crystal display (LCD) projector, flat panel monitor, plasma display (PDP), field emissive display (FED), electro-luminescent (EL) display, micro-mirror technology display, or the like.

In one embodiment, the display controller 110 might scale the digital image data 108 for proper display on the display device 150 using a variety of techniques including pixel replication, spatial and temporal interpolation, digital signal filtering and processing, or the like. In another embodiment, the controller 110 might additionally change the resolution of the digital image data 108, the frame rate, and/or convert the pixel rate encoded in the digital image data 108. Resolution conversion and/or frame rate conversion are not central to the invention and are not discussed in further detail. A person of reasonable skill in the art should recognize that the controller 110 manipulates the digital image data 108 in a variety of manners and provides display data 126 to a display device 150 that is capable of properly displaying a high quality image regardless of display type.

Read-only (ROM) and random access (RAM) memories 122 and 120, respectively, are coupled to the display system controller 110 and might store bitmaps, FIR filter coefficients, or the like. Clock 118 controls timing associated with various operations of the controller 110.

Figure 2:
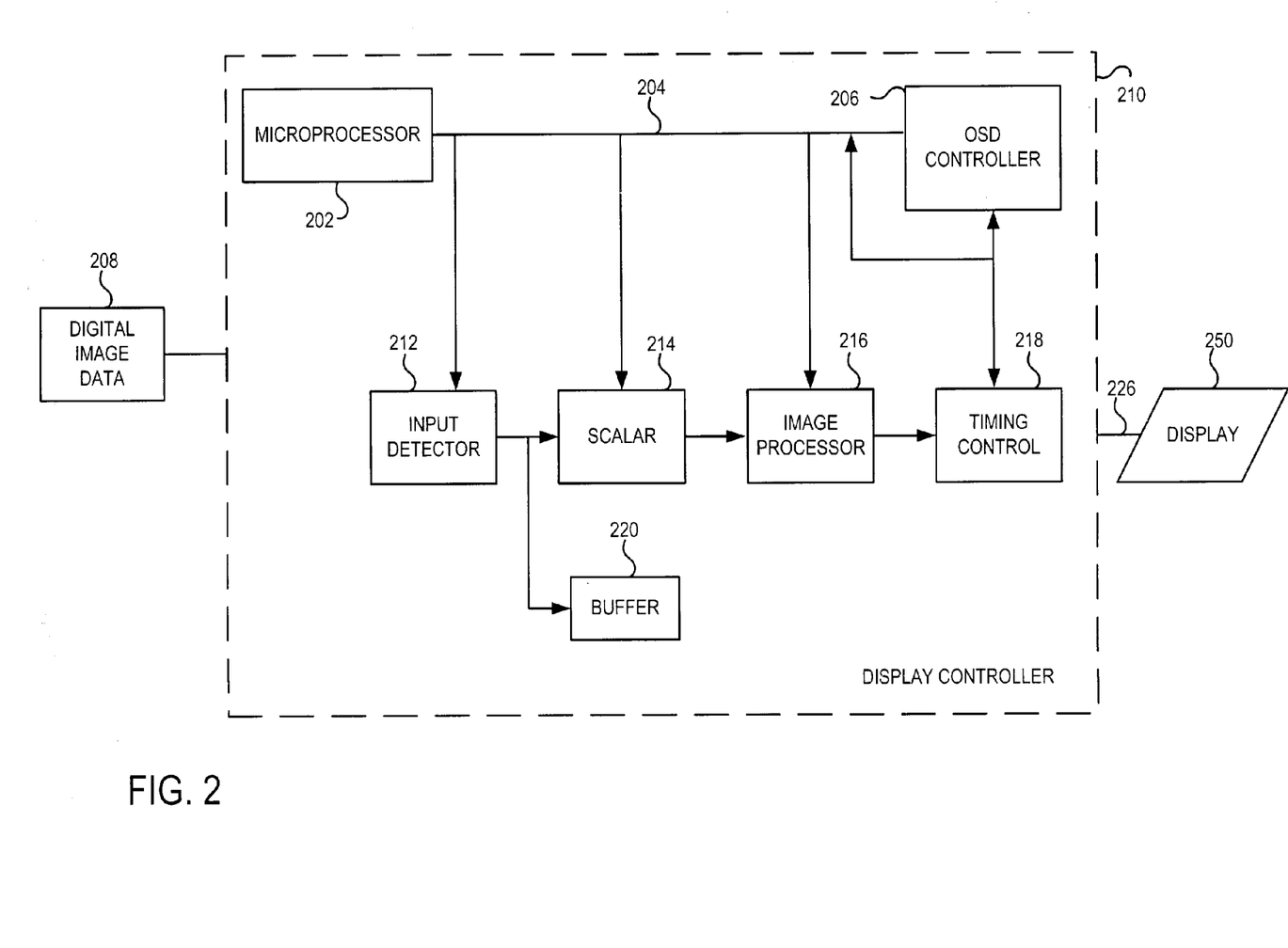
FIG. 2 is a block diagram of an embodiment of the controller shown in FIG. 1.

FIG. 2 is a block diagram of an embodiment of the controller 110 shown in FIG. 1. Referring to FIG. 2, the controller 210 processes digital image data 208 and provides display data 226 to a display device 250. The controller 210 includes a microprocessor 202 adapted to perform all of the control functions necessary for the display controller 210. For example, the microprocessor 202 might control the OSD controller 206, the input detector 212, the scalar 214, or the like. In one embodiment, the microprocessor 202 is an integrated (on-chip) general purpose, microprocessor, e.g., a 16-bit, x86-compatible processor with up to 32 Kbytes of RAM. In another embodiment, the microprocessor 202 is coupled externally to, not integrated with, the display controller 210. The microprocessor 202 might run at high clock rates, e.g., 50 MHz. The microprocessor 202 might include a large address space, for example, of up to a one-megabyte. A person of reasonable skill in the art should recognize that the configuration of the microprocessor 202 varies with the specific application, cost, size, and speed, as well as other constraints.

The display controller 210 receives digital image data 208 at an input detector 212 coupled to the microprocessor 202 through bus 204. The input detector 212 is adapted to detect and/or identify the digital image data 208 and might include a red-green-blue (RGB) port (not shown) for processing digital graphic images and a video port (not shown) for processing video image signals.

The input detector 212 receives digital image data 208 for a digital pixelated image—that is, where the image is represented by an array of individually activated pixels previously converted from an analog image source such as sources 106 and 116 (FIG. 1). The input detector 212 might receive data at high speeds, e.g., up to 230 Mpixels/second, to thereby support a variety of display modes up to UXGA. Alternatively, the input detector 212 might receive RGB data having 1 or 2, 24-bit pixels per clock. The input detector 212 includes a sync processing circuit (not shown) that can operate from separate, composite, or sync-on-green sync signals. The input detector 212 supports both interlaced and progressive scanned RGB inputs as well as on-chip YUV to RGB conversion. The input detector might support half-frequency sampling for lower cost display system implementations. Half-frequency sampling reduces system cost by allowing the use of 100 MHz ADCs —FIG. 1 shows a system 100 including an ADC/TMDS receiver 106—while maintaining UXGA image capturing capabilities. Half-frequency sampling involves capturing even pixels on one frame and odd pixels on the following frame.

The input detector 212 includes a variety of image processing features including automatic image optimization (not shown) for sample clock frequency, phase, black and white levels, image position, and color balance adjustments that do not require user intervention. Advanced synchronization decoding (not shown) allows for a wide variety of synchronization types.

The display controller 210 might include a scalar 214 and a buffer 220 controlled by an image processor 216 and a timing controller 218. The scalar 214 scales the digital image data 208 in a vertical and/or horizontal direction using a variety of scaling techniques as explained above. In one embodiment, the buffer 220 is RAM adapted to buffer scan lines of the digital image data 208. In another embodiment, the buffer 220 is RAM adapted to buffer frames of the digital image data 208. The timing controller 218 is adapted to control timing associated with the image processor 216. The image processor 216, in turn, is adapted to control functional blocks within the controller 210 associated with manipulating the digital image data 208, for example, the scalar 214 or the like. The image processor 216 might include a rotational feature (not shown) that allows rotating a received image by a predetermined number of degrees.

The display controller 210 might further include a full complement of microprocessor peripherals (not shown). In one embodiment, the controller includes I/O ports (e.g., 8-bit I/O ports), an infrared decoder, timers (e.g., 16-bit timers), a watchdog timer, a programmable interrupt controller, an RS-232 serial port, ROM and RAM interface, and decode logic for external peripherals. In another embodiment, the controller 210 might include the above mentioned microprocessor peripherals on-chip, allowing a complete microprocessor system to be implemented by merely adding external memory such as RAM 120 and ROM 122 shown in FIG. 1.

The display controller 210 might further include an OSD controller 206 adapted to control on-screen display processes. The OSD controller 206 is coupled to the microprocessor 202 and other functional blocks (e.g., the input detector 212, the scalar 214, the image processor 216, and timing controller 218) through the bus 204. An embodiment of the OSD controller 206 is shown in FIG. 3.

Figure 3:
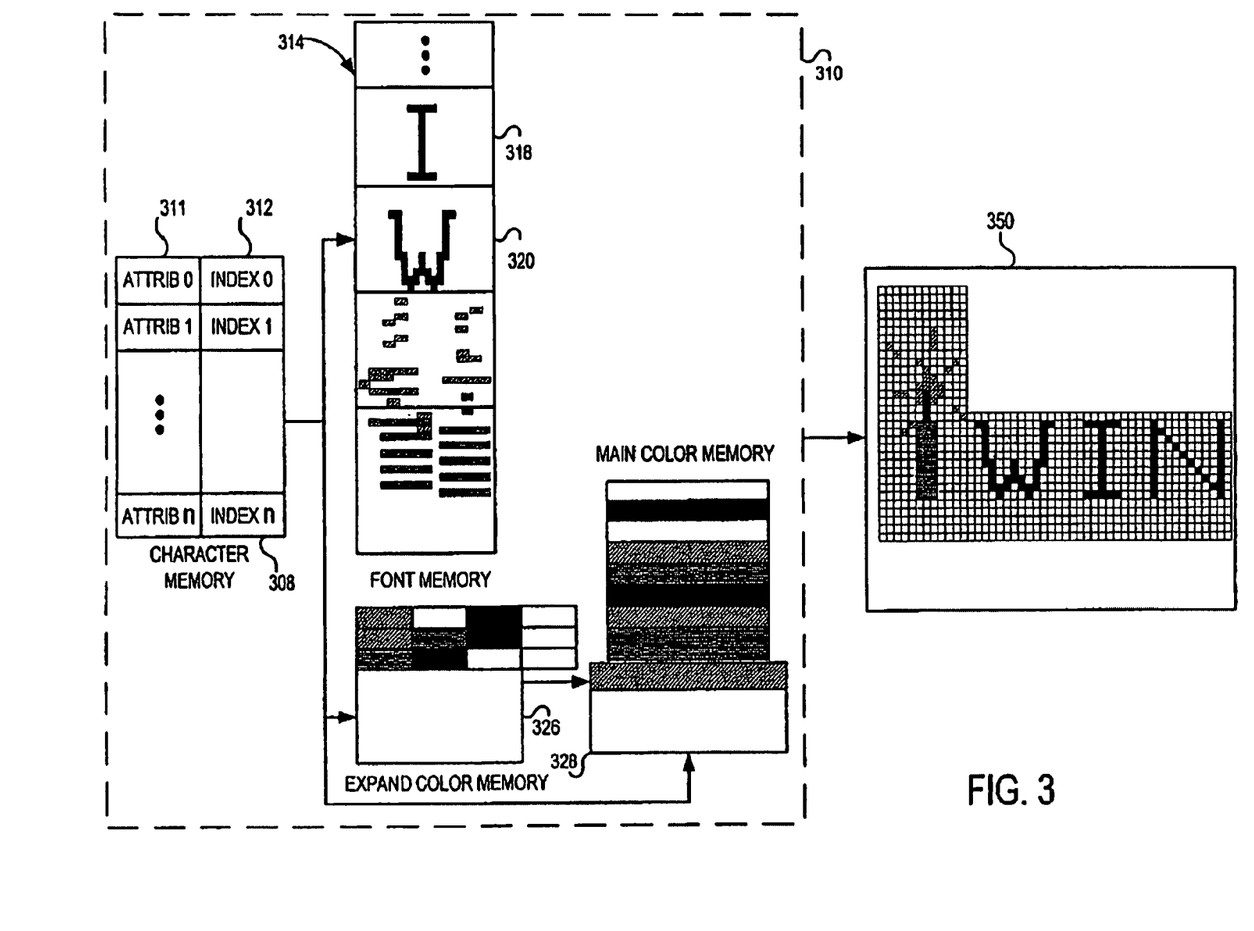
FIG. 3 is a block diagram of an embodiment of the OSD controller shown in FIG. 2.

Referring to FIG. 3, the OSD controller 310 includes a font memory 314, a character memory 308, an expanded color memory 326, and a main color memory 328. The font memory 314 stores bitmaps of individual characters to be displayed on the display 25, rather than large bitmaps of complete display screens. The character memory 308 is adapted to address or index the font memory 314. In one embodiment, the font and character memories 314 and 308, respectively, are RAM.

The character memory 308 includes an index portion 312 and an attribute portion 311. The index portion 312 includes a plurality of indices INDEX0, INDEX1, . . . , INDEXn each adapted to store a font index associating the character to be displayed with its corresponding bitmap stored in the font memory 314. Put differently, each index INDEX0, INDEX1, . . . , INDEXn addresses a bitmap stored in font memory 314 that represents the character to be displayed.

Figure 4:
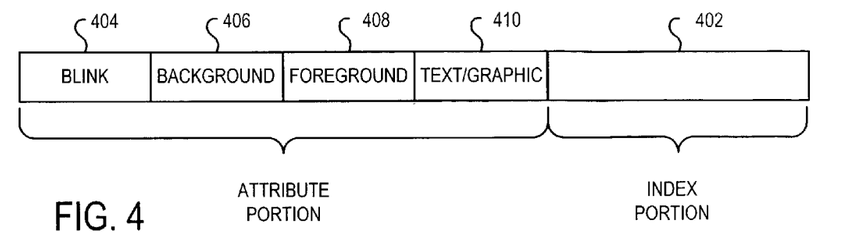
FIG. 4 is a diagram of an embodiment of a portion of the character memory shown in FIG. 3.

The attribute portion 311 includes a plurality of attributes ATTRIB0, ATTRIB1, . . . , ATTRIBn each adapted to store attributes associated with individual characters to be displayed on the display 350. FIG. 4 shows example attributes including a blink attribute 404, a background color attribute 406, a foreground color attribute 408, and a text/graphic attribute 410. Referring to FIGS. 3 and 4, the blink attribute 402 indicates whether a character blinks while being displayed on the display 350. The background and foreground color attributes, as their names imply, indicate background and foreground colors, respectively, for the character to be displayed on the display 350.

The text/graphic attribute 410 indicates whether the character to be displayed on the display 350 is a text character or a graphic clip to allow the OSD controller 310 to display graphics while operating in text mode. The text/graphic attribute 410 allows the OSD controller 310 fast, easy accesses to colorful graphic clips without necessitating slow access to a large, expensive memory.

Each of the plurality of attributes is sized according to the conveyed information. For example, the blink attribute 404 and the background and color attributes 406 and 408, respectively, might each be represented with a single bit. In one embodiment, the text/graphic attribute 410 is represented with a single bit having a first state indicative of a text character and a second state indicative of a graphic clip. A person of reasonable skill in the art should recognize that the plurality of attributes might include a single bit or multiple bits of information depending on a variety of factors including the number of bitmaps stored in the font memory 314.

Figure 5:
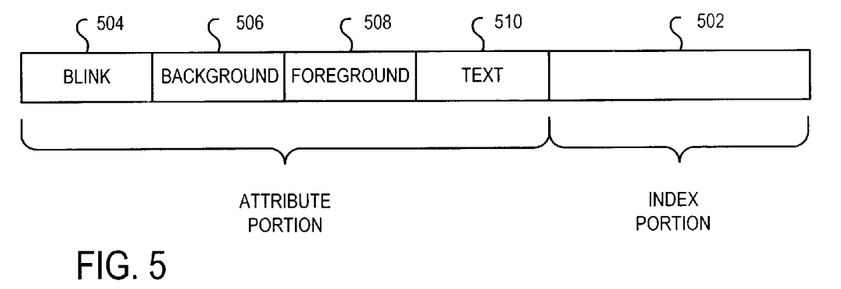
FIG. 5 is a diagram of an embodiment of a portion of the character memory shown in FIG. 3 when the OSD controller displays a text character.
Figure 6:
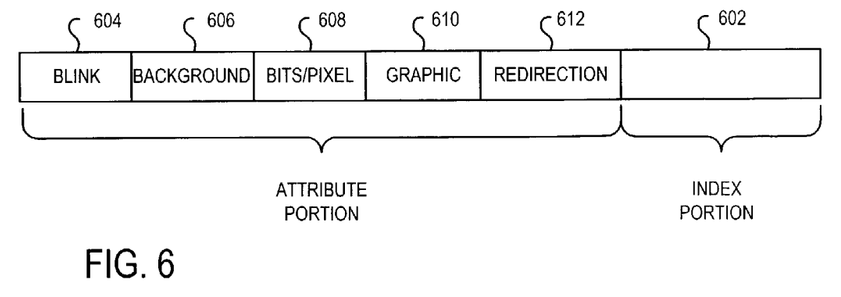
FIG. 6 is a diagram of an embodiment of a portion of the character memory shown in FIG. 3 when the OSD controller displays a graphic clip.

Referring to FIGS. 4, 5, and 6, if the text/graphic attribute 510 indicates a text character, the background and foreground color attributes 506 and 508 indicate background and foreground color, respectively, of the text character to be displayed. If, on the other hand, the text/graphic attribute 610 indicates a graphic clip (not shown), the OSD controller 310 uses the foreground color attribute 608 as an indicator of a number of bits used to represent each pixel in the graphic clip. This is because the foreground color of the graphic clip is encoded in the bitmap stored in the font memory 314 (FIG. 3) and thus, the foreground attribute 408 is unnecessary when dealing with graphic clips. And when the text/graphic attribute 610 indicates a graphic clip, the character memory 308 includes a redirection attribute 612 used to address the main color memory 328 using the expanded color memory 326. Use of the redirection attribute 612 is explained in further detail below.

Referring to FIG. 3, the OSD controller 310 includes a main color memory 328 and an expanded color memory 326. In one embodiment, the main and expanded color memories 328 and 326, respectively, are implemented as color look up tables in, e.g., RAM.

For text characters, the background and foreground color attributes define the background and foreground colors, respectively, referenced in the main color memory 328. For graphic clips, color information is encoded in the bitmapped font stored in the font memory 314. When the number of bits used to represent each pixel in the graphic clip is less than a number of bits used to select a color from the main color memory 328, the redirection attribute 612 is set to indicate the expanded color memory 326 is used to address the main color memory 328.

For example, assume the main color memory 328 includes 16 colors (e.g., 15 colors plus a transparent color). The OSD controller 310 will map a 4-bit color index to true color (e.g., RGB signals each with 8 bits) as follows. For text characters, the OSD controller 310 requires 4 or less bits as a background color attribute 406 (FIG. 4) and 4 bits as a foreground color attribute 408 (FIG. 4) to address the main color memory 328. For graphic clips represented using 2 bits/pixel, the OSD controller 310 requires 4 different combinations for each pixel: 00b, 01b, 10b, and 11b. The expanded color memory 326 converts 2-bits/pixel color into the 4 bits color necessary to address the main color memory 328. Thus, the expanded color memory 326 allows for different color sets for different 2 bits/pixel graphic clips.

Suppose a 2 bits/pixel color 00b is the desired background color for displaying a graphic clip. The converted background color associated with the 2-bits/pixel color $b$ is found by addressing the main color memory 328 using the background color attribute 606 (FIG. 6). For the remaining 2-bits/pixel colors 01b, 10b, and 11b, the expanded color memory 326 is given by Table 1 where n, n_3, n_2, n_1 or the like are 4 bit values.

TABLE 1

| 2 bits/pixel value | 11b | 10b | 01b |
|---|---|---|---|
| Expand_LUT[0] | LUT[0_3] | LUT[0_2] | LUT[0_1] |
| Expand_LUT[1] | LUT[1_3] | LUT[1_2] | LUT[1_1] |
| ... | ... | ... | ... |
| Expand_LUT[n] | LUT[n_3] | LUT[n_2] | LUT[n_1] |

A person of reasonable skill in the art should recognize that other implementations are possible.

An embodiment of the display controller 210 is integrated into a monolithic integrated circuit. Alternatively, any number of discrete logic and other components might implement the invention. A dedicated processor system that includes a microcontroller or a microprocessor might alternatively implement the present invention. A person of reasonable skill in the art should recognize that different functional blocks such as those depicted in FIG. 3 might be integrated with or externally coupled to the display controller 310.

The invention additionally provides methods described below. The invention provides apparatus that performs or assists in performing the methods of the invention. This apparatus might be specially constructed for the required purposes or it might comprise a general-purpose computer selectively activated or reconfigured by a computer program stored in the computer. The methods and algorithms presented herein are not necessarily inherently related to any particular computer or other apparatus. In particular, various general-purpose machines might be used with programs in accordance with the teachings herein or it might prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program and a method of operation of the program. The program is most advantageously implemented as a program for a computing machine, such as a general-purpose computer, a special purpose computer, a microprocessor, or the like.

The invention also provides a storage medium that has the program of the invention stored thereon. The storage medium is a computer-readable medium, such as a memory, and is read by the computing machine mentioned above.

This detailed description is presented largely in terms of block diagrams, timing diagrams, flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories or separate machines where the memories or machines reside in the same or different geographic location. Where the memories or machines are in different geographic locations, they may be connected directly or through a network such as a local access network (LAN) or a global computer network like the Internet®.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. A person having ordinary skill in the art should recognize that the boxes described below might be implemented in different combinations and in different order. Some methods may be used for determining a location of an object, some to determine an identity of an object, and some both.

Figure 7:
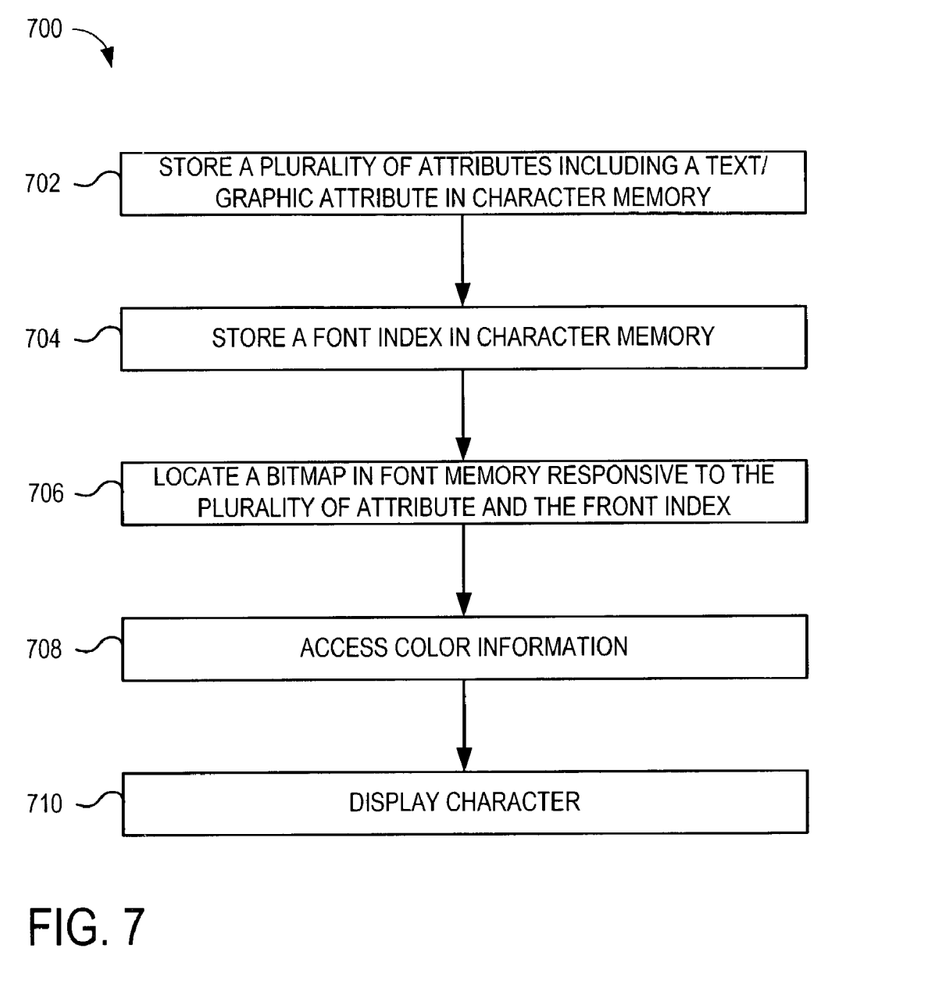
FIG. 7 is a flowchart of an embodiment of the method for mixing text and graphics in an OSD application.

FIG. 7 is a flowchart of an embodiment of the method 700 according to the present invention. Referring to FIG. 7, the method stores a plurality of attributes including a text/graphic attribute in character memory at box 702. The text/graphic attribute indicates whether the character is a text character or a graphic clip. The method stores other attributes including a background and foreground attribute indicative of background or foreground colors, respectively, a redirection attribute indicative of use of an expanded color memory to address a main color memory, a blink attribute indicative of whether the character blinks when displayed, or the like. If the text/graphic attribute indicates a graphic clip, the foreground attribute is used to indicate a number of bits representing each pixel of the graphic clip since the foreground color is encoded into the graphic clip's bitmap stored in font memory. If the number of bits representing each pixel is less than a number of bits used to access color information in the main color memory, the redirection attribute is set to indicate that the expanded color memory be used to address the main color memory.

At box 704, the method stores a font index used to address bitmaps stored in font memory. The method locates a bitmap associated with the character to be displayed in font memory responsive to the plurality of attributes and the font index (box 706). At box 708, the method accesses color information for the character to be displayed using the main color memory. If the redirection attribute is set in the character memory, the method accesses the main color memory using the expanded color memory. At box 710, the method displays the bitmap associated with the character on a display device.

Having illustrated and described the principles of our invention, it should be readily apparent to those skilled in the art that the invention can be modified in arrangement and detail without departing from such principles. I claim all modifications coming within the spirit and scope of the accompanying claims.

The invention claimed is:

1. An on-screen display controller, comprising:
a character memory including an index portion and a plurality of attributes both associated with a character, the plurality of attributes including a type attribute to indicate whether the character is a graphical image or a text character and a foreground color attribute; and
a font memory for storing a bitmap associated with the character, the index portion indicating an address of a bitmap in the font memory;
where the controller accesses the font memory to retrieve the bitmap associated with the character at the address indicated by the index when the type attribute indicates the character is a graphical image;
where, if the type attribute indicates the character is the text character, the controller recognizes the foreground color attribute to indicate a foreground color;
where, if the type attribute indicates the character is a graphical image, the controller is adapted to recognizes the foreground color attribute to indicate a number of bits used to represent each pixel in the graphical image; and
where, if the type attribute indicates the character is a graphical image, the foreground color of the graphical image is encoded in the bitmap;
where, if the type attribute indicates the graphical image, the foreground attribute indicates a predetermined attribute other than a foreground color.

2. The on-screen display controller of claim 1 wherein the type attribute is a single bit having a first and a second state, the first state indicating the character is the text character and the second state indicating the character is the graphical image.

3. The on-screen display controller of claim 1 wherein the type attribute includes a plurality of bits.

4. The on-screen display controller of claim 1
wherein the character memory is a random access memory; and
wherein the font memory is a random access memory.

5. The on-screen display controller of claim 1 including a main color memory indicating colors associated with the character.

6. The on-screen display controller of claim 5 including an expanded color memory mapping predetermined color attributes of the character to the main color memory.

7. The on-screen display controller of claim 6 wherein the plurality of attributes includes a redirection attribute indicating use of the expanded color memory responsive to the type attribute.

8. The on-screen display controller of claim 6 wherein the main and expanded color memories are look up tables.

9. A display system, comprising:
font memory means for storing a bitmap of a character;
character memory means including an index and a plurality of attributes associated with the character, the index being for indicating an address of the bitmap and the plurality of attributes including a type attribute for indicating whether the character is a graphical image or a text character; and
display means for displaying the bitmap;
where the system accesses the font memory means to retrieve the bitmap associated with the character at the address indicated by the index when the type attribute indicates the character is a graphical image;
where, if the type attribute indicates the character is the text character, the system recognizes the foreground color attribute to indicate a foreground color;
where, if the type attribute indicates the character is a graphical image, the system recognizes the foreground color attribute to indicate a number of bits used to represent each pixel in the graphical image; and
where, if the type attribute indicates the character is a graphical image, the foreground color of the graphical image is encoded in the bitmap;
where, if the type attribute indicates the graphical image, the foreground attribute indicates a predetermined attribute other than a foreground color.

10. The display system of claim 9
wherein the type attribute includes a first state indicative of the text character and a second state indicative of the graphical image; and
wherein the plurality of attributes includes a foreground attribute indicating a number of bits per pixel used to represent the graphical image when the type attribute is in a second state.

11. The display system of claim 9 including a color table means and an expanded color table means, the expanded color table means interfacing predetermined color attributes to the color table means.

12. The display system of claim 11 wherein the plurality of attributes includes a background attribute indicating a background color and a table attribute indicating redirection to the expanded color memory table means.

13. A method for displaying a character, comprising:
storing a type attribute and a font index in a character memory, the type attribute indicating a type of character;
locating a bitmap associated with the character in a font memory responsive to the type attribute and the font index, where the font index indicates an address of the bitmap; and
displaying the bitmap on a display device responsive to the type attribute;
accessing the font memory to retrieve the bitmap associated with the character at the address indicated by the font index when the type attribute indicates the character is a graphical image;
if the type attribute indicates the character is the text character, recognizing the foreground color attribute to indicate a foreground color;
if the type attribute indicates the character is a graphical image, recognizing the foreground color attribute to indicate a number of bits used to represent each pixel in the graphical image; and
if the type attribute indicates the character is a graphical image, encoding the foreground color of the graphical image in the bitmap.

14. The method of claim 13 including storing a plurality of attributes other than the type attribute and wherein locating a bitmap includes locating the bitmap responsive to the plurality of attributes.

15. The method of claim 13 wherein storing the type attribute includes storing at least one bit having a first state indicating a graphical image and a second state indicating a text character.

16. The method of claim 15 including storing a foreground and a background color attributes in the character memory indicative of a foreground and background colors respectively.

17. The method of claim 15 including storing a number of bits representing each pixel of the character when the type attribute is in the first state.

18. The method of claim 13 including storing a redirection attribute in the character memory.

19. The method of claim 18 including mapping the character into a main color memory using an expanded color memory responsive to the redirection attribute.

* * * * *

UNITED STATES PATENT AND TRADEMARK OFFICE
CERTIFICATE OF CORRECTION

PATENT NO.        : 7,164,431 B1                                    Page 1 of 1
APPLICATION NO. : 10/142396
DATED             : January 16, 2007
INVENTOR(S)       : Cyrus Chu and Chang-Hau Lee It is certified that error appears in the above-identified patent and that said Letters Patent is hereby corrected as shown below:

Column 8, line 40, the words "controller is adapted to recognizes" should be replaced with -- controller recognizes --.

Signed and Sealed this

Fifteenth Day of July, 2008

JON W. DUDAS
*Director of the United States Patent and Trademark Office*